(12) United States Patent
Jones

(10) Patent No.: US 8,666,028 B2
(45) Date of Patent: Mar. 4, 2014

(54) INTERMEDIARY MONITORING CONTROL

(75) Inventor: Segen Jones, Suwanee, GA (US)

(73) Assignee: Cox Communications, Inc., Atlanta, GA (US)

(*) Notice: Subject to any disclaimer, the term of this patent is extended or adjusted under 35 U.S.C. 154(b) by 636 days.

(21) Appl. No.: 12/611,344

(22) Filed: Nov. 3, 2009

(65) Prior Publication Data

US 2011/0105091 A1 May 5, 2011

(51) Int. Cl.
*H04M 3/22* (2006.01)
*H04M 3/42* (2006.01)

(52) U.S. Cl.
USPC ............ 379/32.01; 379/210.02; 455/414.1

(58) Field of Classification Search
USPC .......... 455/414.1, 415; 379/32.01–35, 379/210.02–210.03
See application file for complete search history.

(56) References Cited

U.S. PATENT DOCUMENTS

| 7,869,792 | B1* | 1/2011 | Zhou et al. | 455/411 |
| 7,970,388 | B2* | 6/2011 | Pfeffer et al. | 455/414.1 |
| 2007/0111714 | A1* | 5/2007 | Edwards | 455/415 |
| 2008/0146211 | A1* | 6/2008 | Mikan et al. | 455/419 |

OTHER PUBLICATIONS

"My Mobile Watchdog Opens Communication Between You and Your Child—Family Contacts". © 2009 eAgency, Inc., RADAR[SM] and My Mobile Watchdog® are the service marks of eAgency. http://www.mymobilewatchdog.com/works.shtml. 2 pgs.

"My Mobile Watchdog—Monitor Your Child's Cell Phone, Text Messages and Email With Alerts". © 2009 eAgency, Inc., RADAR[SM] and My Mobile Watchdog® are the service marks of eAgency. http://www.mymobilewatchdog.com/. 2 pgs.

Olsen, Stefanie. "Software lets parents monitor kids' calls—CNET News". Jul. 10, 2007. http://news.cnet.com/software-lets-parents-monitor-kids-calls/2009-1025_3-6195666.html. 5 pgs.

"FlexiSpy Gives Parents (and others) wide Mobile Phone Monitoring Abilities". Jul. 21, 2009 by filtering facts. http://filteringfacts.org/2009/04/21/flexispy-gives-parents-and-others-wide-mobile-phone-monitoring-abilities/.

Huffman, Mark. ConsumerAffair.com. "AT&T Adds Parental Controls to Mobile Phones". Sep. 4, 2007. http://www.consumeraffairs.com/news04/2007/09/att_parental.html. 4 pgs.

"Kiddie phones have parental controls". USATODAY.com. Copyright 2008 USA Today, a division of Gannett Co. Inc. http://www.usatoday.com/tech/2005-08-03-baig-kid-phones_x.htm. 3 pgs.

Kharif, Olga. "Parental Controls . . . For Mobile Phones? You Bet". Aug. 16, 2005. http://www.businessweek.com/the_thread/techbeat/archives/2005/08/parental_contro.html. 14 pgs.

"SMobile Security Shield Parental Control Edition: SMobile Parental Controls Demo". Date believed to be some time in 2006. http://www.smparentalcontrols.com/media.htm. 2 pgs.

(Continued)

*Primary Examiner* — Wesley Kim
*Assistant Examiner* — Nam Huynh
(74) *Attorney, Agent, or Firm* — Merchant & Gould

(57) ABSTRACT

Systems and methods are disclosed for allowing a monitoring party to have intermediary control over a communication between a calling party and a called party. A notification may be sent to a monitoring party of an incoming communication attempt to a called party, and the monitoring party may control the routing and/or processing of the communication based on a real-time response to the notification.

16 Claims, 3 Drawing Sheets

(56) References Cited

OTHER PUBLICATIONS

"SMobile Security Shield Parental Control Edition: Lock, Wipe, Backup and Restore". © 2006 SMobile Systems. http://www.smparentalcontrols.com/lock.htm. 1 pg.

"SMobile Security Shield Parental Control Edition: Monitoring Dashboard". © 2006 SMobile Systems. http://www.smparentalcontrols.com/dashboard.htm. 1 pg.

"SMobile Security Shield Parental Control Edition: View Contacts". © 2006 SMobile Systems. http://www.smparentalcontrols.com/contacts.htm. 1 pg.

"SMobile Security Shield Parental Control Edition: Call/Monitoring". © 2006 SMobile Systems. http://www.smparentalcontrols.com/callmonitoring.htm. 1 pg.

"SMobile Security Shield Parental Control Edition: E-Mail and Text Message Monitoring & Alert Notifications". © 2006 SMobile Systems. http://www.smparentalcontrols.com/monitoring.htm. 1 pg.

"SMobile Security Shield Parental Control Edition: SMobile Security Shield". © 2006 SMobile Systems. http://www.smparentalcontrols.com/smparentalcontrols.com. 1 pg.

\* cited by examiner

INTERMEDIARY MONITORING CONTROL

BACKGROUND

Wireless communication devices are used extensively by a variety of users from business persons to children. In some cases, a supervising person (e.g., business owner/manager or parent, etc.) may have a concern about a user of a wireless communication device (e.g., employee or child) receiving an unwanted or undesirable communication.

Some current monitoring and parental control applications may allow for a monitoring party to set a usage limit of a wireless communication device, or set restricted usage times. Some applications may allow for a monitoring party to designate "allowed" and "unapproved" numbers from which communications may or may not be received. Other applications may allow a monitoring party to receive an alert when an incoming call or message is received from someone not designated as an "allowed" number. Other applications may allow for a monitoring party to capture content of short message service (SMS) messages and e-mail messages.

While these systems provide some useful monitoring and parental control features, current systems do not allow for a monitoring party to have real-time control over an incoming call or message.

SUMMARY

Consistent with embodiments of the present invention, systems and methods are disclosed for allowing a monitoring party to have intermediary control over a call or message made between a calling party and a called party. According to an embodiment, a notification may be sent to a monitoring party of an incoming call or message to a called party on a wireless communication device, and the monitoring party may control the routing and/or processing of the call or message based on a real-time response to the notification.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

Figure 1:
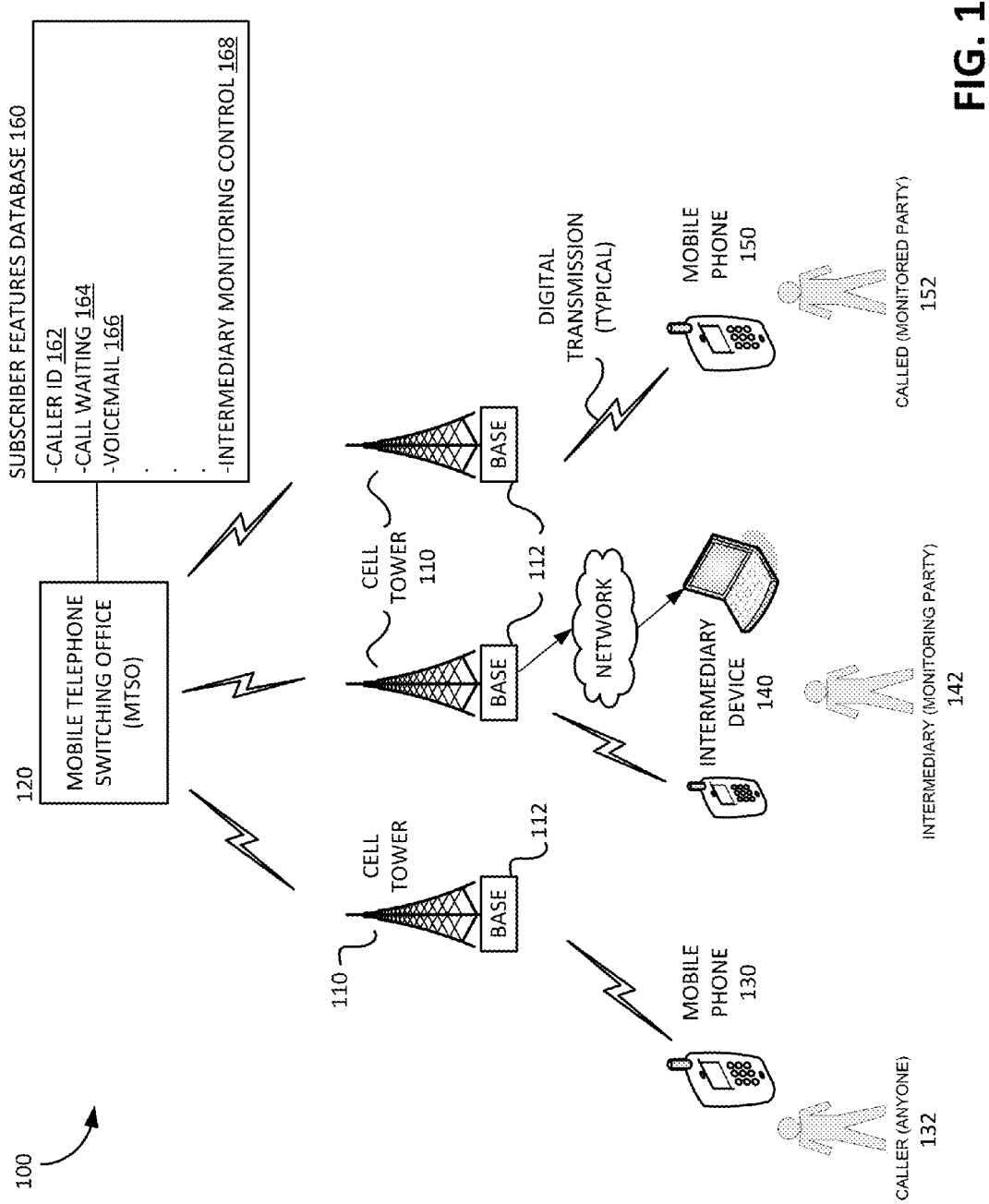
FIG. 1 is simplified block diagram illustrating a wireless communication network architecture that serves as an exemplary operating environment for the present invention.

As briefly described above, embodiments of the present invention are directed to systems and methods for allowing a monitoring party to have intermediary control over a communication made between a calling party and a called party. As will be described below, according to embodiments, an intermediary monitoring party (e.g., a business supervisor, teacher, parent, or the like) may provision an Intermediary Monitoring Control feature on a wireless communication device number so that the intermediary monitoring party may exercise specified control over communications (e.g., calls, messages, emails, etc.) made to a monitored wireless device.

When communications are placed to a monitored device, a control center for the monitored device may route the communications to the monitoring party who may exercise specified control over how the communication will be completed to the monitored (called) party. For example, a caller may be an unknown party, a called party may be a child, and an intermediary monitoring party may be a parent or guardian of the child. As another example, intermediary control monitoring may be utilized within a business where it may be deemed appropriate for calls to be monitored and/or controlled for security reasons. A caller may be a known or unknown party, a called party may be an employee, and an intermediary monitoring party may be an employer, manager, supervisor, or security monitor of the employee.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is a simplified block diagram illustrating a wireless communication network architecture that serves as an exemplary operating environment for the present invention. As should be understood, the example wireless communication network architecture illustrated in FIG. 1 is for purposes of example and is not limiting of a variety of communications configurations that may be utilized as described herein. Referring now to FIG. 1, wireless communication services are provided by various service provider companies through a wireless network 100. As is known to those skilled in the art, wireless networks may consist of but not be limited to cellular towers 110, base stations 112, and a Mobile Telephone Switching Office (hereafter referred to as "MTSO") 120.

As is known to those skilled in the art, a cellular tower 110 typically consists of a steel pole or lattice structure outfitted with antennae for transmitting and receiving signals to and from wireless devices (for example, mobile phone, personal digital assistant (PDA), smart phone, etc.), other cellular towers, and the MTSO. Each cellular tower 110 may have multiple sets of antenna mounted, depending upon how many different service providers use the tower 110.

The base 112 of each cellular tower 110 includes sets of transmitters and receivers from each service provider having antennae mounted to the tower 110. As a unit, the cellular tower 110 and the base 112 form a system capable of transmitting, receiving, and managing data. This data may consist of, but not be limited to, voice, text, and/or electronic media. As is understood by those skilled in the art, wireless systems typically operate at various frequencies (e.g., across a frequency range from 800 megahertz (MHz) to 1900 MHz), depending upon which wireless technology is utilized. According to the embodiments of the present invention, an Intermediary Monitoring Control (IMC) systems may operate across this typical network of wireless systems, and therefore in the same frequency ranges.

Referring still to FIG. 1, a wireless network may also employ the use of a wireless electronic communication device 130,140,150 (e.g., mobile phone, personal digital assistant (PDA), smart phone, etc.) capable of sending and receiving data in the same frequency range as the wireless communications system. The term "mobile device" will be used herein to describe a wireless electronic communication device capable of sending and receiving electronic communications. As is understood by those skilled in the art, a mobile device 130,140,150 comprises, but is not limited to, an internal circuit board, antenna, liquid crystal display (LCD), keyboard, microphone, speaker, and a battery. All of these components and systems making up a mobile device 130,140,150 work together to send, receive, and manage data within and beyond the cellular network.

Referring still to FIG. 1, an MTSO 120 serves as a central control center for the base stations 112 operating in a given area. For example, an MTSO 120 may be configured for controlling wireless communications for a wireless service provider operating in a specified city or other suitable operating area or region. In addition to other operating functions of the MTSO, according to embodiments of the present invention, the MTSO 120 may serve as control point for determining, providing and controlling subscriber features. For example, in accordance with embodiments of this invention, a customer information database 160 may contain data to allow a determination as to whether a particular feature or service is provisioned for a given wireless communications device account. An example of such a feature or service may be Caller ID 162, Call Waiting 164, Voicemail 166, or IMC 168. Thus, if a caller 132 using mobile device 130 attempts a call to mobile device 150, a customer information database 160 may be parsed to determine which features to provision before completing the connection with a called party 152.

As briefly described above, if a monitoring party (e.g., business supervisor, teacher, parent, and the like) is authorized to monitor wireless communications placed to a monitored party (e.g., employee, student, child, etc.), an Intermediary Monitoring Control feature may be provisioned at the MTSO on the monitored party's wireless device. When communications are received at the MTSO for routing to the monitored party's device, the communications may be routed first to the monitoring party's wireless device to allow the monitoring party to exercise certain controls over the communication. Examples of such controls include, but are not limited to, allowing the communication to proceed to the called party; causing the communication to forward to another number (including to a voicemail service); blocking or prohibiting the communication from proceeding to the called party; allowing the monitoring party to listen to the communication between the calling and called parties; allowing the monitoring party to view text-type messages between the calling and called parties; allowing the monitoring party to record the communication between the calling and called parties either at the MTSO or at the monitoring device; allowing the monitoring party to view a call history and a text message history for a called party 152; allowing the monitoring party to identify a service provider network of a calling party, and the like.

As described below, when a communication directed to a monitored party is routed to the monitoring party, the monitoring party may select one of a number of such communication processing options. Upon selection of a desired option, the selected option is transmitted from the monitoring party device 140 back to the MTSO, and the MTSO processes the communication from the calling party to the monitored (called) party accordingly.

In FIG. 1, the intermediary or monitoring party device 140 is illustrated as a mobile device, such as a cellular telephone or wireless personal digital assistant. As should be appreciated, the monitoring party device may include other devices, such as wired telephones, wireless or wired computers or any other suitable communications device to which a communication may be routed by the MTSO for receiving the monitoring party's communication control instructions as described herein. That is, an intermediary/monitoring party 142 may utilize a variety of computing devices which may contain an application for providing intermediation between a caller 132 and a called party 152, such as a mobile phone or a PDA. Alternatively, an IMC application 168 may be a web-based application and run on an intermediary's 142 personal computer or other networked computing device. Thus, the term "intermediary device" 140 is used herein to describe any device used by monitoring party 142 to intermediate a call or message between a caller 132 and a called party 152.

Figure 2:
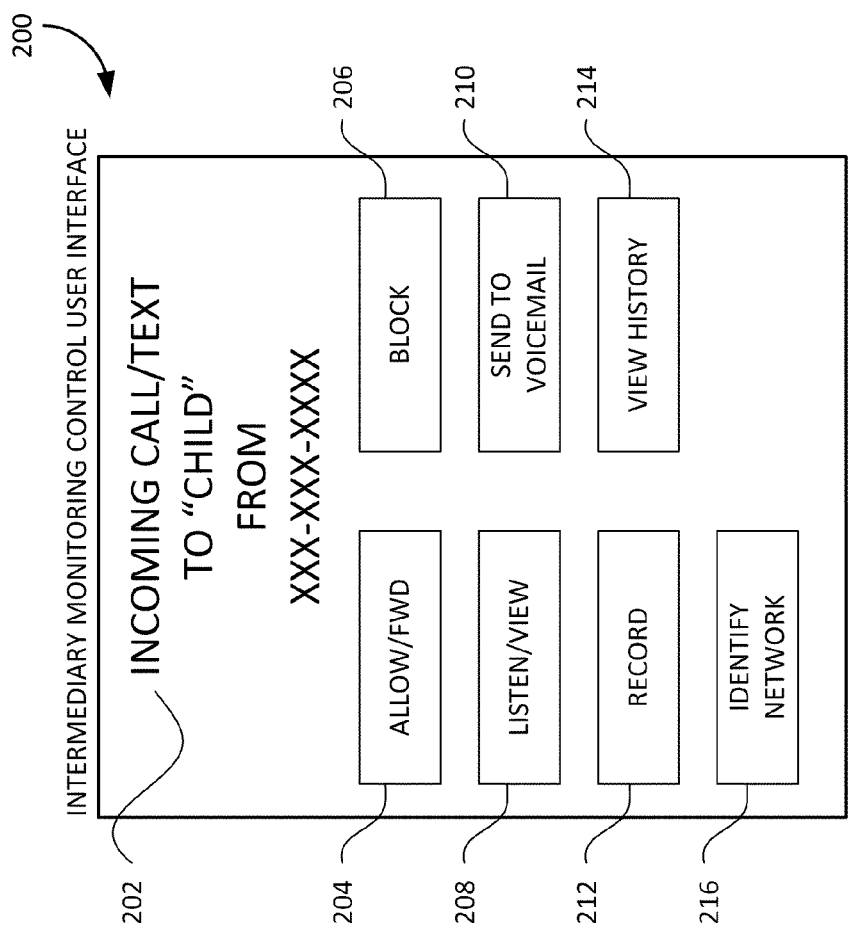
FIG. 2 is a simplified block diagram illustrating an interactive user interface according to the embodiments of the present invention.

Referring now to FIG. 2, an Intermediary Monitoring Control user interface 200 may be displayed on the monitoring party's wireless device 140 (or other suitable communication device) when a communication from to a monitored party (e.g., a child of the monitoring party) is received to allow the monitoring party to exercise one or more of the various controls described herein. According to embodiments of the present invention, the IMC user interface 200 may be displayed on an LCD touch-screen with pre-programmed push-buttons or an LCD screen, which is not a touch-screen, but which may be activated using a device keypad, each of which may provide options for controlling a communication between a calling party 132 and a called party 152.

The IMC user interface 200 may include a general message area. For example, the general message area 202 may display an incoming communication from a caller 132 intended for a called party 152. A communication may be a telephone call, an SMS message, an MMS message, an e-mail message, or any other communication that may be sent or received utilizing a mobile device 130,140,150. The term "communication" will herein be used to describe any one of various forms of communications to or from a mobile communication device.

According to embodiments of the present invention, one or more selectable options may be displayed for allowing the monitoring party to control a communication between a calling and called party. Referring to the user interface 200, Option 204 may be provided for allowing a user 142 of an intermediary device 140 to "Allow or Forward" a communication to a called party 152. Option 206 may be provided for allowing a user 142 of an intermediary device 140 to "Block" a communication to a called party 152 with an additional option to "Block" all future call from specified caller 132 or just for the current call. Option 208 may be provided for allowing a user 142 of an intermediary device 140 to "Listen" to a call between a caller 132 and a called party 152, or "View" a communication (e.g., SMS, MMS, e-mail, etc.) between a caller 132 and a called party 152. Option 210 may be provided for allowing a user 142 of an intermediary device 140 to send a call from caller 132 to a voice mailbox of the intermediary 142. Option 212 may be provided for allowing a user 142 of an intermediary device 140 to allow a telephone call from a caller 132 to a called party 152 but to "Record" the conversation. Option 214 may be provided for allowing a user 142 of an intermediary device 140 to view a call history and a text message history for a called party 152. Finally, option 216 may be provided for allowing a user 142 of an intermediary device 140 to identify a service provider network of a caller 132. As should be appreciated the communication disposition options illustrated in FIG. 2 are for purposes of example and are not limiting of other options that may be available according to embodiments of the invention.

Figure 3:
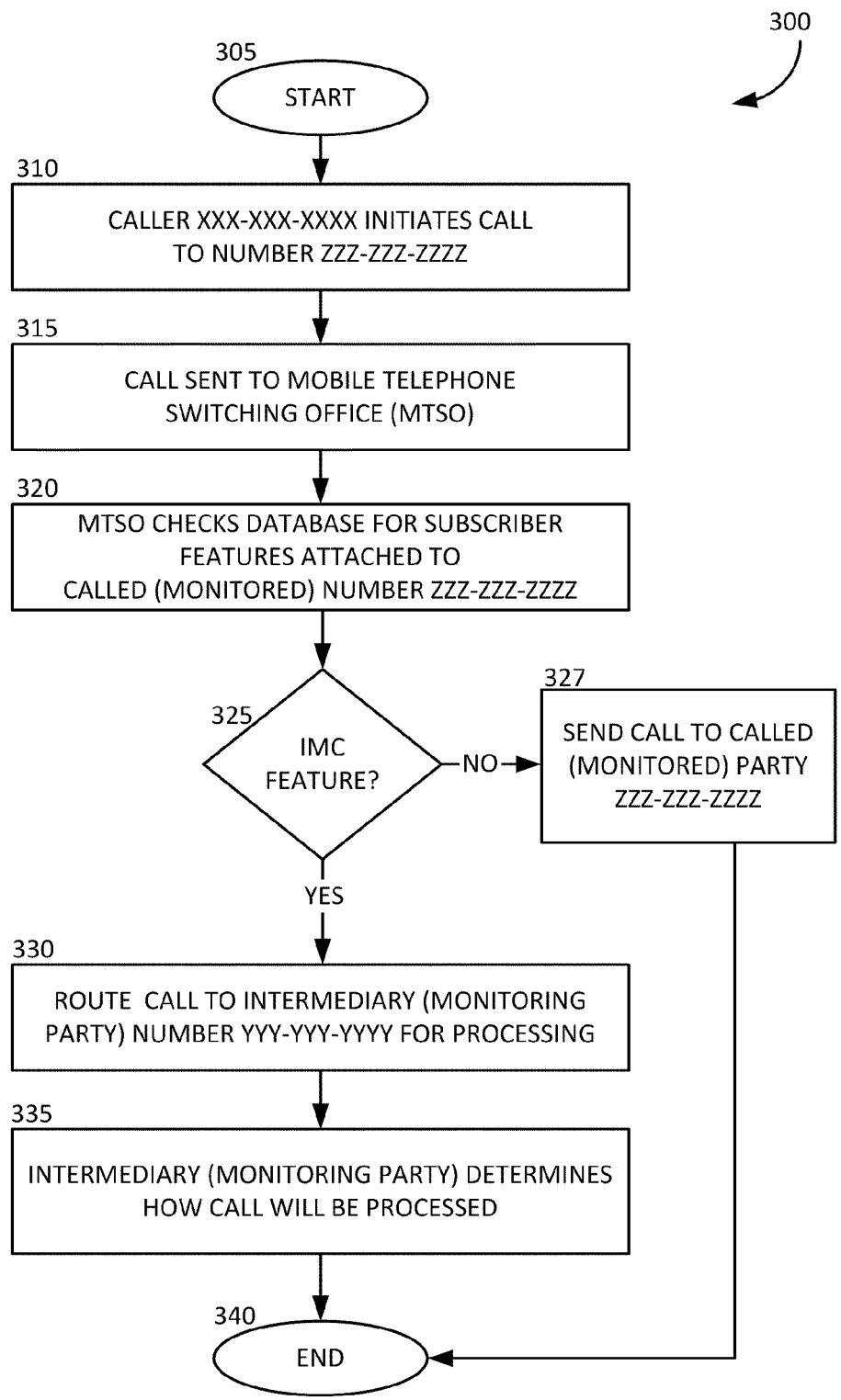
FIG. 3 is a flow diagram showing an illustrative routine for monitoring and controlling a communication made between two separate parties via a wireless network.

Having described an exemplary operating environment 100 with respect to FIG. 1 and having described an example IMC user interface 200 with respect to FIG. 2, FIG. 3 is a flow diagram showing an illustrative routine 300 for monitoring and controlling communications intended for a called party 152.

The routine 300 begins at start block 305 and proceeds to block 310 where a caller 132, identified with telephone number XXX-XXX-XXXX initiates a call intended for a called party 152, identified with telephone number ZZZ-ZZZ-ZZZZ.

At block 315, a MTSO receives and processes a call from caller 132. At block 320, the MTSO parses a customer information database 160 for subscriber features associated with the called party's 152 wireless communications service plan. At decision block 325, a determination is made at the MTSO as to whether an IMC feature 168 is a feature provisioned on the called 152 party's wireless device number. If the IMC feature 168 is not a provisioned feature for called party 152, the call from caller 132 proceeds to block 327. At block 327, the call is passed through to the called party 152 without the IMC feature. The routine ends at block 340.

Now referring back to decision block 325, if an IMC feature 168 is a provisioned feature for called party 152, then the routine proceeds to block 330. At block 330, the MTSO obtains a routing address for the monitoring device (e.g., wireless device telephone number), and routes the incoming communication to the monitoring or intermediary device 140. This routing of the incoming communication includes sending a notification of the received communication to the monitoring communication device, wherein the notification may be displayed in the area 202, as illustrated in FIG. 2. At block 330 the MTSO also determines which one or more communication processing instructions the monitoring party may issue for processing a communication directed to the called party. The IMC user interface 200 is launched on the intermediary device 140 which allows for receipt from the monitoring device one of the one or more communication processing instructions.

The intermediary or monitoring party 142 may exercise one or more available controls over the incoming communication as described above. Once the intermediary 142 selects a given control, the selection is passed back through the network 100 to the MTSO, and the MTSO processes the call as instructed. For example, if the intermediary selects Option 206, illustrated in FIG. 2, then the MTSO will block the communication or simply not route the communication to the called party. For another example, if the intermediary selects Option 208, the MTSO will connect the incoming communication to both the intermediary or monitoring device 140 and the called device 150 so that the monitoring party may listen to the communication. As should be appreciated, if the monitoring party device 140 is not activated at the time of the incoming communication, then the communication may be automatically routed to the called party, or some type of default disposition instruction may be followed, such as automatically blocking the communication. The routine ends at block 340.

According to another embodiment, an IMC feature 168 may be utilized to control an outgoing communication from a monitored party 152 to a recipient. When a monitored party 152 initiates a communication to an intended recipient, if an IMC feature 168 is enabled, the communication may be sent to an intermediary device 140, and an IMC user interface 200 may be displayed. An intermediary 142 may select how to process the communication utilizing the interactive IMC user interface 200.

As described herein, methods and systems are provided for allowing an intermediary or monitoring party to exert one or more specified controls over a communication between a calling party and a called party. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

I claim:

1. A method for providing intermediary monitoring control of a wireless communication, the method comprising:
configuring a mobile telephone switching office (MTSO) for controlling wireless communications and for determining, providing and controlling subscriber features;
providing a customer information database at the MTSO for storing features associated with each subscriber;
receiving a communication at the MTSO from a calling party directed to a called party;
parsing the customer information database to determine, from the features associated with the subscriber, whether the communication from the calling party directed to the called party should be monitored by a monitoring party;
upon determining the communication from the calling party directed to the called party should be monitored by a monitoring party, provisioning call monitoring according to the customer information database at the MTSO by sending a notification of the received communication from the MTSO to a monitoring communication device of the monitoring party, identifying one or more communication processing instructions the monitoring party may issue for processing the communication directed from the calling party to the called party, and provisioning an intermediary monitoring control feature on the monitoring communication device of the monitoring party to present the identified one or more communication processing instructions for selection by the monitoring party, the identified one or more communication processing instructions including options to allow the communication, block the communication, allow and listen to the communication between the calling party and the called party, record the communication, send the communication to another number, and view history between the calling party and the called party;
receiving, at the MTSO, a communication processing instruction selected by the monitoring party from the identified one or more communication processing instructions displayed by the provisioned intermediary monitoring control feature on the monitoring communication device of the monitoring party; and
in response to receiving the communication processing instruction from the monitoring communication device of the monitoring party, processing the communication from the calling party to the called party according to the communication processing instruction received from the monitoring communication device.

2. The method of claim 1, wherein determining a routing address for the monitoring communication device of the monitoring party upon the determining the communication from the calling party directed to the called party should be monitored by a monitoring party.

3. The method of claim 1, wherein processing the communication from the calling party to the called party according to the communication processing instruction received from the monitoring communication device includes allowing the communication from the calling party to the called party to be completed.

4. The method of claim 1, wherein processing the communication from the calling party to the called party according to the communication processing instruction received from the monitoring communication device includes prohibiting the communication from the calling party to the called party to be completed.

5. The method of claim 1, wherein processing the communication from the calling party to the called party according to the communication processing instruction received from the monitoring communication device includes allowing a viewing of a text-type communication from the calling party to the called party to be viewed at the monitoring communication device.

6. The method of claim 1, wherein processing the communication from the calling party to the called party according to the communication processing instruction received from the monitoring communication device includes allowing the communication from the calling party to the called party to be completed and includes a recording of the communication from the calling party to the called party.

7. The method of claim 1, wherein processing the communication from the calling party to the called party according to the communication processing instruction received from the monitoring communication device includes allowing a provision of a call history of communications to the called party at the monitoring communication device.

8. The method of claim 1, wherein processing the communication from the calling party to the called party according to the communication processing instruction received from the monitoring communication device includes providing an identification of a communications service provider of the calling party at the monitoring communication device.

9. A system for providing intermediary monitoring control of a wireless communication, the system comprising:
   a communications device of a calling party operative to transmit a communication directed to a called party;
   a communications device of a called party operative to receive the communication from the communications device of a calling party;
   a monitoring communication device of a monitoring party for monitoring the communication between the communications device of the calling party and the communications device of the called party; and
   a mobile telephone switching office (MTSO), coupled to the communications device of the calling party, the communications device of the called party and the monitoring communication device of the monitoring party, the MTSO having a customer information database at the MTSO for storing features associated with each customer, the MTSO operative
      to receive the communication at the MTSO from a calling party directed to a called party;
      to parse the customer information database to determine, from the features associated with the subscriber, whether the communication from the calling party directed to the called party should be monitored by a monitoring party;
      to determine whether the communication from the calling party directed to the called party should be monitored by a monitoring party, provisioning call monitoring according to the customer information database at the MTSO to send a notification of the received communication from the MTSO to the monitoring communication device of the monitoring party, to identify one or more communication processing instructions the monitoring party may issue for processing the communication directed from the calling party to the called party, and to provision an intermediary monitoring control feature on the monitoring communication device of the monitoring party to present the identified one or more communication processing instructions for selection by the monitoring party, the identified one or more communication processing instructions including options to allow the communication, block the communication, allow and listen to the communication between the calling party and the called party, record the communication, send the communication to another number, and view history between the calling party and the called party;
      to receive, at the MTSO, a communication processing instruction selected by the monitoring party from the identified one or more communication processing instructions displayed by the provisioned intermediary monitoring control feature on the monitoring communication device of the monitoring party; and
      in response to receiving the communication processing instruction from the monitoring communication device of the monitoring party, to process the communication from the calling party to the called party according to the communication processing instruction received from the monitoring communication device.

10. A non-transitory computer readable medium containing computer executable instructions which when executed by a computer provide a method for providing intermediary monitoring control of a wireless communication, the method comprising:
   configuring a mobile telephone switching office (MTSO) for controlling wireless communications and for determining, providing and controlling subscriber features;
   providing a customer information database at the MTSO for storing features associated with each subscriber;
   receiving a communication at the MTSO from a calling party directed to a called party;
   parsing the customer information database to determine, from the features associated with the subscriber, whether the communication from the calling party directed to the called party should be monitored by a monitoring party;
   upon determining the communication from the calling party directed to the called party should be monitored by a monitoring party, provisioning call monitoring according to the customer information database at the MTSO by sending a notification of the received communication from the MTSO to a monitoring communication device of the monitoring party, identifying one or more communication processing instructions the monitoring party may issue for processing the communication directed from the calling party to the called party, and provisioning an intermediary monitoring control feature on the monitoring communication device of the monitoring party to present the identified one or more communication processing instructions for selection by the monitoring party, the identified one or more communication processing instructions including options to allow the communication, block the communication, allow and listen to the communication between the calling party and the called party, record the communication, send the communication to another number, and view history between the calling party and the called party;
   receiving, at the MTSO, a communication processing instruction selected by the monitoring party from the identified one or more communication processing instructions displayed by the provisioned intermediary monitoring control feature on the monitoring communication device of the monitoring party; and in response to receiving the communication processing instruction from the monitoring communication device of the monitoring party, processing the communication from the calling party to the called party according to the communication processing instruction received from the monitoring communication device.

11. The non-transitory computer readable medium of claim 10, wherein processing the communication from the calling party to the called party according to the communication processing instruction received from the monitoring communication device includes prohibiting the communication from the calling party to the called party to be completed.

12. The non-transitory computer readable medium of claim 10, wherein processing the communication from the calling party to the called party according to the communication processing instruction received from the monitoring communication device includes allowing the communication from the calling party to the called party to be completed.

13. The non-transitory computer readable medium of claim 10, wherein processing the communication from the calling party to the called party according to the communication processing instruction received from the monitoring communication device includes allowing a viewing of a text-type communication from the calling party to the called party to be viewed at the monitoring communication device.

14. The non-transitory computer readable medium of claim 10, wherein processing the communication from the calling party to the called party according to the communication processing instruction received from the monitoring communication device includes allowing the communication from the calling party to the called party to be completed and includes a recording of the communication from the calling party to the called party.

15. The non-transitory computer readable medium of claim 10, wherein processing the communication from the calling party to the called party according to the communication processing instruction received from the monitoring communication device includes allowing a provision of a call history of communications to the called party at the monitoring communication device.

16. The non-transitory computer readable medium of claim 10, wherein processing the communication from the calling party to the called party according to the communication processing instruction received from the monitoring communication device includes providing an identification of a communications service provider of the calling party at the monitoring communication device.

* * * * *